(12) United States Patent
Zhu et al.

(10) Patent No.: US 11,258,495 B2
(45) Date of Patent: Feb. 22, 2022

(54) HYBRID BEAMFORMING METHOD FOR WIRELESS MULTI-ANTENNA AND FREQUENCY-DIVISION DUPLEX SYSTEMS

(71) Applicant: Ping Liang, Newport Coast, CA (US)

(72) Inventors: Dengkui Zhu, Beijing (CN); Boyu Li, Irvine, CA (US); Ping Liang, Newport Coast, CA (US)

(73) Assignee: RF DSP Inc., Irvine, CA (US)

( * ) Notice: Subject to any disclaimer, the term of this patent is extended or adjusted under 35 U.S.C. 154(b) by 438 days.

(21) Appl. No.: 16/091,984

(22) PCT Filed: Apr. 10, 2017

(86) PCT No.: PCT/US2017/026735
§ 371 (c)(1),
(2) Date: Oct. 7, 2018

(87) PCT Pub. No.: WO2017/180485
PCT Pub. Date: Oct. 19, 2017

(65) Prior Publication Data
US 2019/0115963 A1    Apr. 18, 2019

Related U.S. Application Data

(60) Provisional application No. 62/321,153, filed on Apr. 11, 2016.

(51) Int. Cl.
*H04B 7/06* (2006.01)
*H04W 16/28* (2009.01)
(Continued)

(52) U.S. Cl.
CPC ......... *H04B 7/0617* (2013.01); *H04B 7/0452* (2013.01); *H04B 7/0626* (2013.01);
(Continued)

(58) Field of Classification Search
None
See application file for complete search history.

(56) References Cited

U.S. PATENT DOCUMENTS 10,177,451 B1 * 1/2019 Baraban ............ H04B 7/18506
2011/0268166 A1 * 11/2011 Chen .................. H04B 7/0617
375/224

(Continued)

OTHER PUBLICATIONS

H. Ghauch, T. Kim, M. Bengtsson and M. Skoglund, "Subspace Estimation and Decomposition for Large Millimeter-Wave MIMO Systems," in IEEE Journal of Selected Topics in Signal Processing, vol. 10, No. 3, pp. 528-542, Apr. 2016, doi: 10.1109/JSTSP.2016.2538178. (Year: 2016).*

(Continued)

*Primary Examiner* — Jenkey Van
(74) *Attorney, Agent, or Firm* — George Guosheng Wang; United States Research and Patent Firm (57) ABSTRACT

This invention presents a method and systems for beamforming in wireless communication comprising a base station with a plural of antennas and radio frequency transmitting and receiving chains, a plural of base band transmitting paths and base band receiving paths, and a processor that constructs a subspace for each user equipment using the principal angle information contained in partial channel state information obtained on channels associated with a part of the BS antennas, derives an analog beamforming matrix and/or an analog combining matrix from the subspaces of all the user equipment selected for communication with the base station to achieve analog beamforming, and further performs beamforming at the base band.

3 Claims, 8 Drawing Sheets

(51) Int. Cl.

| | |
|---|---|
| *H04B 7/0452* | (2017.01) |
| *H04W 88/10* | (2009.01) |
| *H04W 88/02* | (2009.01) |
| *H04W 88/08* | (2009.01) |

(52) U.S. Cl.
CPC ........... *H04W 16/28* (2013.01); *H04W 88/10* (2013.01); *H04W 88/02* (2013.01); *H04W 88/08* (2013.01)

(56) References Cited

U.S. PATENT DOCUMENTS

| | | | |
|---|---|---|---|
| 2014/0050280 A1* | 2/2014 | Stirling-Gallacher | ..................... H04B 7/0617 375/296 |
| 2014/0225776 A1* | 8/2014 | Harel | ..................... H01Q 3/26 342/373 |
| 2016/0020843 A1* | 1/2016 | Li | ..................... H04L 65/80 375/267 |
| 2017/0141828 A1* | 5/2017 | Tosato | ................. H04B 7/0626 |

OTHER PUBLICATIONS

T. L. Marzetta, "Noncooperative Cellular Wireless with Unlimited Numbers of Base Station Antennas," IEEE Trans. Wireless Commun., vol. 9, No. 11, pp. 3590-3600, Nov. 2010.

F. Rusek, D. Persson, B. Lau, E. G. Larsson, T. L. Marzetta, O. Edfors, and F. Tufvesson, "Scaling up MIMO: Opportunities and Challenges with Very Large Arrays," IEEE Signal Process Mag , vol. 30, No. 1, pp. 40-46, Jan. 2013.

E. G. Larsson, F Tufvesson, O. Edfors, and T. L. Marzetta, "Massive MIMO for Next Generation Wireless Systems," IEEE Commun. Mag., vol. 52, No. 2, pp. 186-195, Feb. 2014.

X. Zhang, A. F. Molisch, and S. Kung, "Variable-phase-shift-based RF-baseband codesign for MIMO antenna selection," IEEE Trans. Sig. Process., vol. 53, No. 11, pp. 4091-4103, Nov. 2005.

V. Venkateswaran and A. J. Van Der Veen, "Analog beamforming in MIMO communications with phase shift networks and online channel estimation," IEEE Trans. Sig. Process., vol. 58, No. 8, p. 4131-4143, Aug. 2010.

S. Hur, T. Kim, D. Love, J Krogmeier, T. Thomas, and A. Ghosh, "Millimeter wave beamforming for wireless backhaul and access in small cel networks," IEEE Transactions on Communications., vol. 61, No. 10, p. 4391-4403, 2013.

Y Tsang, A Poon, and S Addepaili, "Coding the beams: Improving beamforming training in mmwave communication system," in in Proc. of 2011 IEEE Global Telecommunications Conference (GLOBECOM), Houston, TX.

A Sayeed and J Brady, "Beamspace MIMO for high-dimensional multiuser communication at millimeter-wave frequencies," in Pr oc IEEE Global Telecommun. Conf (Globecom), pp. 3679-3684, Dec. 2013.

A Alkhateeb, O. El Ayach, G. Leus, and R W. Heath. JR, "Channel Estimation and Hybrid Precoding for Millimeter Wave Cellular Systems" IEEE Journal of Selected Topics in Signal Processing., vol. 8, No. 5, pp. 831-846, Oct. 2014.

L. Liang, W. Xi and X. Dong, "Low-Complexity Hybrid Precoding in Massive Multiuser MIMO Systems," IEEE Wireless Communications Letters, vol. 3, No. 6, pp. 653-356, Dec. 2014.

X. Hou, Z. Zhang, and . H. Kayama, "DMRS Design and Channel Estimation for LTE-Advanced MIMO Uplink," in VTC 2009 Fall, Anchorage, AK, 2009.

* cited by examiner

HYBRID BEAMFORMING METHOD FOR WIRELESS MULTI-ANTENNA AND FREQUENCY-DIVISION DUPLEX SYSTEMS

FIELD OF INVENTION

This invention relates generally to Multiple-Input Multiple-Output (MIMO) and Frequency-Division Duplex (FDD) wireless communication networks or systems, and more particularly, to a novel method for calculating the analog beamforming matrix in the downlink and analog combining matrix in the uplink and the baseband precoding/detection matrix based on the partially measured Channel State Information (CSI) as well as the apparatus and systems to implement this method.

BACKGROUND

Massive Multiple-Input Multiple-Output (MIMO) or large-scale MIMO systems were firstly introduced in [1] in which each Base Station (BS) is equipped with dozens to hundreds of antennas to serve tens of users simultaneously through Multi-User MIMO (MU-MIMO) in the same time-frequency resource. Therefore, they can achieve significantly higher spatial multiplexing gains than conventional MU-MIMO systems by linear beamforming methods, e.g., Zero-Forcing (ZF) which can achieve performance very close to the channel capacity, and have drawn great interest from both academia and industry [2][3]. Moreover, massive MIMO is viewed as one of the most promising techniques for the 5th Generation (5G) wireless communication systems and has been included in the latest 3rd Generation Partnership Project (3GPP) Long Term Evolution (LTE) standard release 13, where it is termed as Full Dimension (FD) MIMO.

Figure 1:
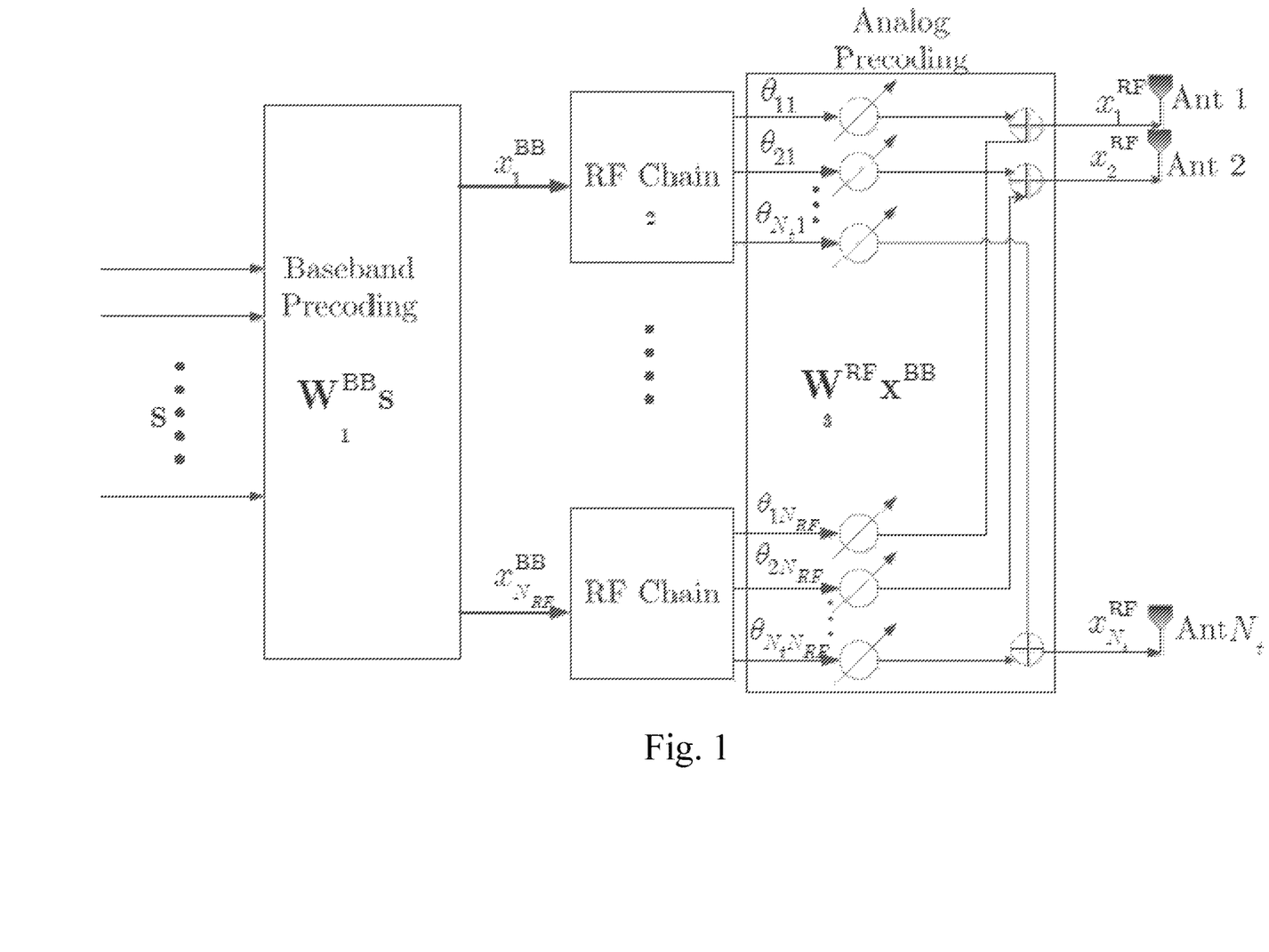
FIG. 1 shows the transmitter architecture of a BS with global analog precoding.
Figure 2:
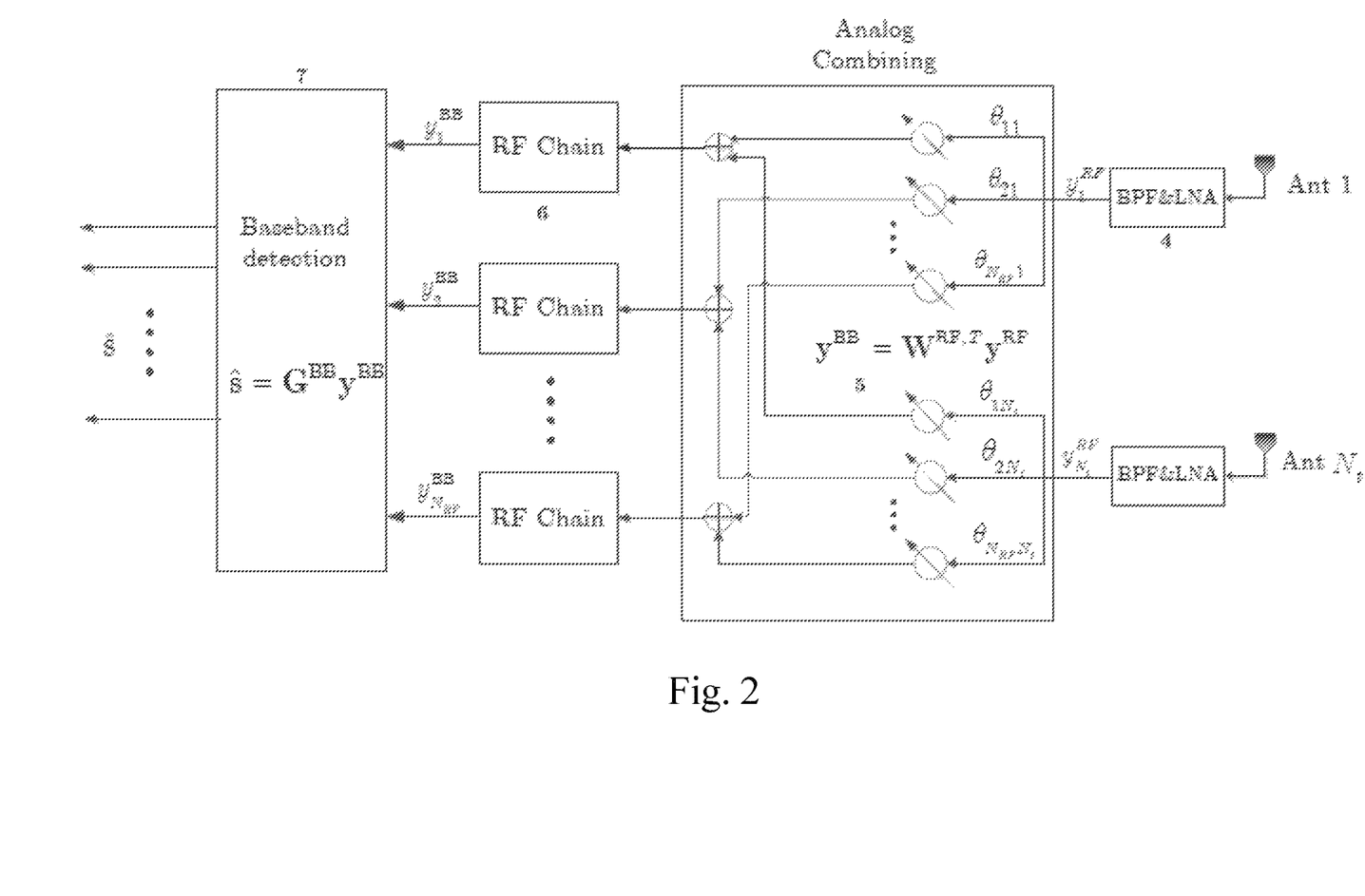
FIG. 2 shows the receiver architecture of a BS with global analog precoding.

Despite of the advantages, there still exist very tough challenges for applying massive MIMO to practical systems. To exploit the gains of large-scale antenna arrays, take the downlink as an example, the signals of ail the antennas are firstly processed at the baseband, e.g., channel estimation, precoding, etc., then up-converted to the carrier frequency after passing through digital-to-analog (D/A) converters, mixers, and power amplifiers, i.e., Radio Frequency (RF) chains. Outputs of the RF chains are then coupled with the antenna elements. As a result, it introduces huge baseband computation complexity, e.g., for ZF precoding per precoding unit in the downlink, where $N_t$ and K are the numbers of antennas at the BS and the number of users per MU-MIMO group respectively. Moreover, each antenna element needs a dedicated RF chain, increasing the implementation cost substantially when $N_t$ is very large and requiring high power consumption of mixed signal components, which might result in impractically high complexity for digital baseband precoding. On the other hand, cost-effective variable phase shifters are readily available with current circuit technologies, which enable the possibility to apply high dimensional phase-only RF or analog processing [4][5]. Due to these reasons, Hybrid Beamforming (HB) [6][7], was proposed and considered as the promising solution to address this problem in practical systems in which the global beamforming is decomposed into baseband digital precoding/detection and RF analog precoding/combining respectively so that the signal dimension at the baseband, i.e., the number of RF chains, is reduced to a much smaller number than that of the physical antennas. The architecture of the BS transmitter with HB is shown in FIG. 1, where the signal transmitted on each antenna is the summation of the phase shifted copies from ail the RF chains. The architecture of the BS receiver with HB is shown in FIG. 2, where the signal received on each antenna is copied and phase shifted to be combined to generate the signals passed to the baseband for further processing. Other than the conventional micro-wave commercial communication systems, HB also has been considered as the most promising beamforming method for millimeter Wave (mm-Wave) communication systems with large-scale antenna arrays [5][6].

The prior three HB methods were proposed in [8]-[10] for the downlink transmission. In [8], the beam space or mask of the channel vector of each user is computed first based on full CSI, i.e., several vectors in Discrete Fourier Transformation (DFT) matrix. The analog precoding matrix of a MU-MIMO group is consisted of the beam spaces of all the K users. In [9], an iterative HB method for Single-User MIMO (SU-MIMO) with partial CSI is derived. In [10], the phase component of the MU-MIMO channel matrix is used as the analog precoding matrix. However, all of these methods face at least one of the three following problems:

1) The full CSI, i.e., the channel coefficient of each antenna, is assumed to be available at the baseband to compute the analog precoding matrix, which is impractical for practical systems with limited number of RF chains. If the CSI is measured by users transmitting uplink Sounding Reference Signals (SRSs), however, due to the limited number of RF chains in HB systems, the full CSI is unavailable. If the CSI is measured by downlink CSI-RS, the pilot overhead is substantially huge because of the large number of antennas. Moreover, the measured CSI has to be quantized before feedback to the BS. Hence, full CSI is unavailable for practical systems.
2) The analog precoding matrix is derived based on the CSI of users in a single MU-MIMO group. However, for practical OFDM-based systems, e.g., LTE/LTE-A, as multiple MU-MIMO groups are scheduled in one OFDM symbol, these algorithms suffer large performance loss as they are only suited for a single MU-MIMO group.
3) They mainly focus on the TDD systems where the downlink channel over the air is assumed to be symmetric to the uplink according to the channel reciprocity. While channel reciprocity is not applicable any more for FDD systems, the uplink and downlink channel need to be measured independently in conventional systems and it doubles the pilot overhead of FDD systems and increases the implementation complexities compared to TDD systems.

For this reason, this invention specially provides HB methods and apparatus for FDD systems to overcome these shortcomings of prior arts. The proposed methods construct a subspace for each user firstly at the BS based on the principal angle information contained in the partial CSI feedback from the UE or obtained directly at the BS side. Then, the unified analog beamforming matrix is derived with the subspaces of all the users in the system. Finally, the base band beamforming is employed.

BRIEF DESCRIPTION OF DRAWINGS

The aforementioned implementation of the invention as well as additional implementations would be more clearly understood as a result of the following detailed description of the various aspects of the invention when taken in conjunction with the drawings. Like reference numerals refer to corresponding parts throughout the several views of the drawings.

DETAILED DESCRIPTION

Reference may now be made to the drawings wherein like numerals refer to like parts throughout. Exemplary embodiments of the invention may now be described. The exemplary embodiments are provided to illustrate aspects of the invention and should not be construed as limiting the scope of the invention. When the exemplary embodiments are described with reference to block diagrams or flowcharts, each block may represent a method step or an apparatus element for performing the method step. Depending upon the implementation, the corresponding apparatus element may be configured in hardware, software, firmware or combinations thereof. Hereafter, a pilot signal may mean a signal transmitted by one antenna for the purpose of estimating the channel between the transmitting antenna and one or more receiving antennas. It may also be called a reference signal, a channel estimation signal or a test signal.

Consider a MU-MIMO wireless communication system, where the BS has $N_t$ antennas for transmitting and receiving. Assuming all the User Equipments (UEs) needed to be served in the next period of time consist of a set $\Phi$, where the cardinality of $\Phi$ is $N_{ue}=|\Phi|$. For Orthogonal Frequency Division Multiplexing (OFDM)-based systems, K single-antenna UEs are multiplexed on the same time-frequency resource through MU-MIMO technology, where the time-frequency resource is organized as multiple consecutive OFDM symbols in the time domain by multiple subcarriers in the frequency domain, e.g., one to several Resource Blocks (RBs) in LTE/LTE-A systems. Although the descriptions in this patent focus on the single-antenna UE case, they can be directly generalized to the multi-antenna UE case. Let $N_{RF}$ denote the number of RF chains at the BS, considering a Resource Element (RE), i.e., an OFDM symbol in the time domain at a single subcarrier in the frequency domain, for the downlink transmission, the MU-MIMO precoding can be written as $$x^{RF}=Ws=W_{dl}^{RF}x^{BB}=W_{dl}^{RF}W^{BB}s, \quad (1.1)$$

where W is the effective global precoding matrix with a dimension of $N_t \times K$, $W_{dl}^{RF}$ is the analog precoding matrix at the RF with a dimension of $N_t \times N_{RF}$, $W^{BB}$ is the baseband precoding matrix with a dimension of $N_{RF} \times K$, $x^{RF}$ is the signal vector transmitted at the physical antenna ports with a dimension of $N_t \times 1$, s is the transmitted signal vector at the baseband with a dimension of $K \times 1$, i.e., one for each UE, and $x^{BB}$ is the signal vector transmitted from the baseband to the RF with a dimension of $N \times 1$.

Similarly, the uplink signal detection before de-modulation can be formulated as $$\hat{s}=Gy^{RF}=G^{BB}W_{ul}^{RF}y^{RF}=G^{BB}y^{BB}, \quad (1.2)$$

where G is the effective global detection matrix with a dimension $K \times N_t$, $W_{ul}^{RF}$ is the analog combining matrix at the RF with a dimension $N_{RF} \times N_t$, $G^{BB}$ is the baseband detection matrix with a dimension of $K \times N_{RF}$, $y^{RF}$ is received signal vector at the physical antenna ports with a dimension of $N_t \times 1$, s is the transmitted signal vector by the K UEs with a dimension of $K \times 1$, i.e., one for each UE, and $y^{BB}$ is the signal vector passed from the RF to the baseband of the BS with a dimension of $N_{RF} \times 1$.

Note that in (1.1) and (1.2), the matrices $W^{BB}$ and $G^{BB}$ are applied in the frequency domain at the baseband, which means that they can be different for each subcarrier, while $W_{dl}^{RF}$ or $W_{ul}^{RF}$ is applied in the time domain at the RF, which means that it keeps constant in the whole frequency band. Hence, any analog precoding/combining method that needs $W_{dl}^{RF}$ or $W_{ul}^{RF}$ to vary for different subcarriers in frequency domain is not achievable.

For the downlink transmission, when the BS completes the scheduling and UE grouping, it needs to compute the baseband precoding matrix for each RE based on the channel matrix of the MU-MIMO group on each RE seen from the baseband, i.e., $H_{dl}^{BB}$, which is defined as $$H_{dl}^{BB}=H_{dl}W_{dl}^{RF}, \quad (1.3)$$

where $H_{dl}$ is the MU-MIMO channel matrix from all the physical antennas of the BS to the K UEs in the MU-MIMO group in the downlink. Note that the RE index is ignored for clarity because it does not affect the application of this patent. Hence, the BS needs to compute a unique analog precoding matrix $W_{dl}^{RF}$ for the UEs to be served in the next period of time first, then $H_{dl}^{BB}$ is measured based on $W_{dl}^{RF}$. As shown in FIG. 1, the signals are first precoded at the baseband 1, then the output signals of the precoder are passed the radio frequency (RF) circuit through RF chains 2 before being mapped to antennas. With the RF or analog beamforming 3, signals are finally radiated into the air.

For the uplink transmission, when the BS completes scheduling and UE grouping, it needs to compute the analog combing matrix $W_{ul}^{RF}$ for these UEs so that the channel matrix seen at the baseband for signal detection is $$H_{ul}^{BB}=H_{ul}W_{ul}^{RF}, \quad (1.4)$$

where $H_{ul}$ is the MU-MIMO channel matrix from all the physical antennas of the BS to the K UEs in a MU-MIMO group in the uplink. Note that the RE index is ignored for clarity because it does not affect the application of this patent. Hence, the BS needs to compute a unique analog precoding matrix $W_{ul}^{RF}$ for the UEs to be served in the next period of time first, then $H_{ul}^{BB}$ is measured based on $W_{ul}^{RF}$. As shown in FIG. 2, the received signals at each antenna from multiple UEs are first passed through the low noise amplifier (LNA) and band pass filter (BPA) 4, then the output signals are mapped to RF chains 6 by analog combine or receiving beamforming 5. After that, the output signals of analog beamforming are passed through the detection module 7 to decode signals belonging to each UE.

For the analog precoding network in FIG. 1 and analog combining network shown in FIG. 2, each element of $W_{dl}^{RF}$ or $W_{ul}^{RF}$ can be chosen as any constant amplitude complex number, which is called Global Analog Beamforming (GAB), i.e., the signals of each RF chain are the weighted summation of signals from all the antennas in the uplink while the signal transmitted at each antenna is the weighted summation of signals from all the RF chains in the downlink.

Figure 3:
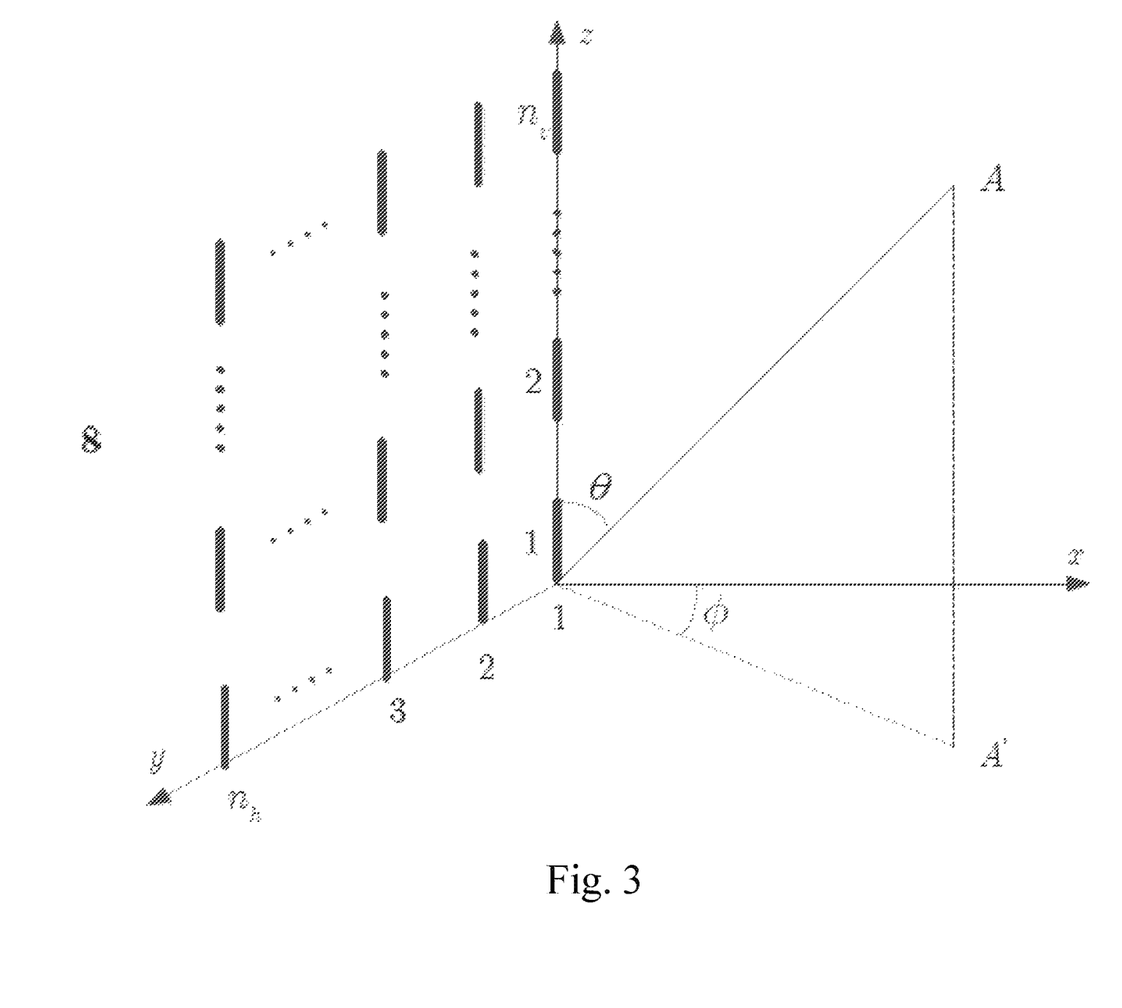
FIG. 3 shows a planar antenna array with single polarized antennas.
Figure 4:
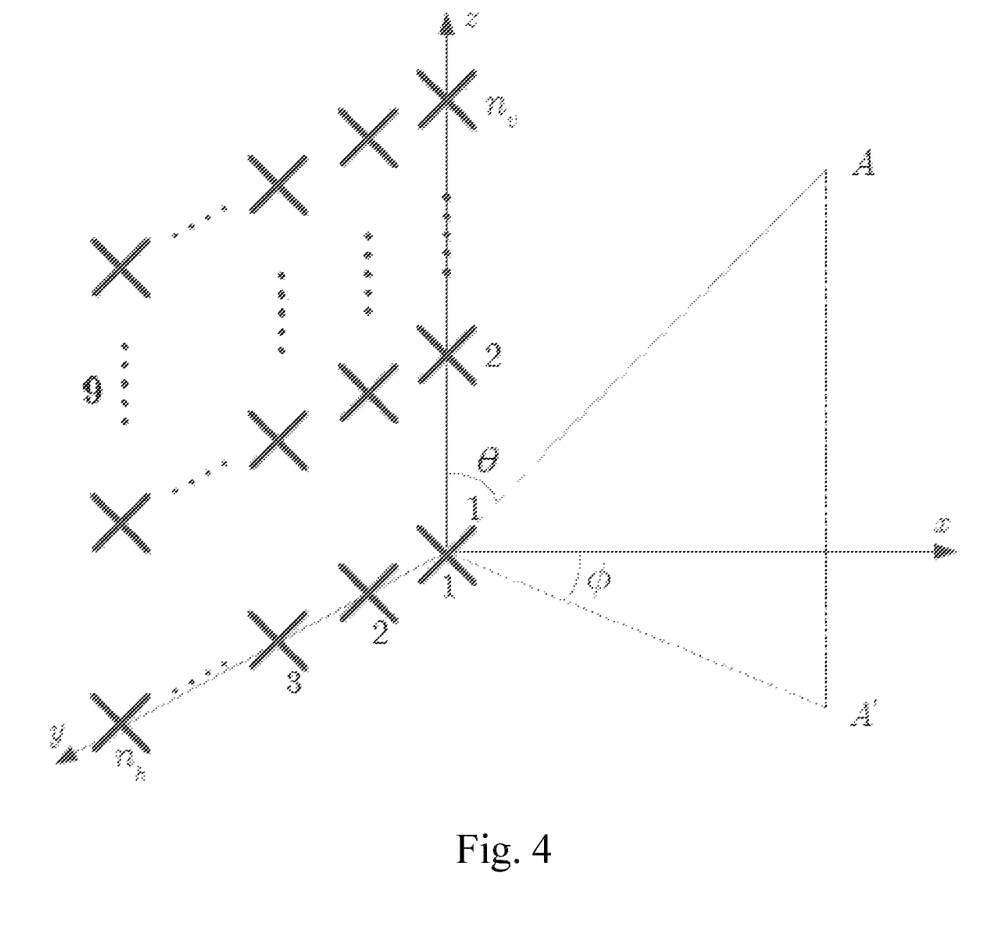
FIG. 4 shows a planar antenna array with cross-polarized antennas.

For the antenna array at the BS side, one embodiment is shown in FIG. 3, where the $N_t$ single polarized antennas 8 are placed as a planer array with $n_h$ antennas per row with space $d_h$ in terms of wavelength in the horizontal dimension and antennas per column with space $d_v$ terms of wavelength in the vertical dimension. The antennas are indexed along the horizontal dimension first, then the vertical dimension. Another antenna array embodiment is shown in FIG. 4 with cross-polarized antennas 9.

For the FDD systems, to compute $W_{dl}^{RF}$ or $W_{ul}^{RF}$ for the served $N_{ue}$ UEs, the BS needs to construct the subspace for the channel vector between the BS antenna array and each UE in the uplink and downlink respectively. Two methods can be used to realize this process.

Method I

In this method, the uplink channel between the BS and a UE is measured by the uplink pilot signals and used to construct the subspace $V_k^{ul}$ and calculate $W_{ul}^{RF}$. The downlink subspace of each UE $V_k^{dl}$ is constructed by modifying the uplink $V_k^{ul}$ and then used to calculate $W_{dl}^{RF}$.

In this method, each UE transmits uplink pilot in the uplink specific channel, e.g., the SRS channel in LTE/LTE-A. At the BS side, after combined by the analog combining matrix $W_{ul,rs}^{RF}$ for RSs, the received signals are passed to the baseband. Let $r_{rf}(t)$ and $r_{bb}(t)$ denote these received pilot signals at physical antennas and these signals after combined and passed to the baseband at the time instant t, then their relation is written as $$r_{bb}(t)=W_{ul,rs}^{RF} r_{rf}(t). \tag{1.5}$$

Different structures of $W_{rs}^{RF}$ denote different antenna virtualization methods or analog combining network at the RF. For GAB, the received signals from the antennas of any row or the superposition of multiple rows are reserved for the horizontal dimension. A similar method is applied to the columns of the antenna array for the vertical dimension. With the assumption $n_h+n_v \leq N_{RF}$, two typical embodiments of the choices of $W_{ul,rs}^{RF}$ are $$W_{ul,rs}^{RF} = \begin{bmatrix} I_{n_h} & 0 & \cdots & 0 \\ E_1 & E_2 & \cdots & E_{n_v} \\ 0 & 0 & \cdots & 0 \end{bmatrix} \tag{1.6}$$

and $$W_{ul,rs}^{RF} = \begin{bmatrix} I_{n_h} & I_{n_h} & \cdots & I_{n_h} \\ A_1 & A_2 & \cdots & A_{n_v} \\ 0 & 0 & \cdots & 0 \end{bmatrix}, \tag{1.7}$$

where $E_k$, k=1, . . . , $n_v$ denotes a $n_v \times n_h$ matrix with all 0 except one 1 on the first element of the kth row, $A_k$, k=1, . . . , $n_v$ denotes a $n_v \times n_h$ matrix with all 0 except all 1 on the kth row, and 0 is a $(N_{RF}-n_v-n_h) \times n_h$ matrix with all 0. Note that if the condition $n_h+n_v \leq N_{RF}$ cannot be satisfied, the signals at the antenna can be further down-sampled in the horizontal and vertical dimensions respectively, i.e., the signals from part of a row and a column of antennas are passed to the baseband. With $r_{bf}(t)$, after a series of baseband processing, i.e., A/D, Cyclic Prefix (CP) removal, Fast Fourier Transformation (FFT), etc., the signals are used to estimate the channel on the sampled antennas by the methods such as in [11]. Let the $n_h \times 1$ vectors $\hat{h}_h^{hor}(i)$ and $n_v \times 1$ vectors $\hat{h}_k^{ver}(i)$, i=1, . . . , $n_{rs}$, denote the two sets of estimated channel vectors of the kth user on the pilot subcarriers in the horizontal and vertical dimensions respectively, where $n_{rs}$ is the number of subcarriers for pilot signals.

Next, the subspace $V_k^{ul}$ that the uplink channel vector of the kth user is located is constructed first.

The first principal steering vector to represent the channel of the kth user in the horizontal dimension is estimated by $$\hat{e}_k^{hor}(\hat{\alpha}_k^{hor}) = \underset{\alpha \in [-1,1)}{\operatorname{argmax}} \, e_{n_h}^H(\alpha) \hat{R}_k^{hor} e_{n_h}(\alpha), \tag{1.8}$$

where $$\hat{R}_k^{hor} = \sum_{i=1}^{n_{rs}} \hat{h}_k^{hor}(i) \hat{h}_k^{hor}(i) \tag{1.9}$$

and $$e_{n_h}(\alpha)=[1 \; e^{j2\pi\alpha} \; \cdots \; e^{j2\pi(n_h-1)\alpha}]^T \tag{1.10}$$

is called a steering vector with angle $\alpha$ and length $n_h$.

Similarly, the first principle steering vector to represent the channel of the feth user in the vertical dimension is estimated by $$\hat{e}_k^{ver}(\hat{\alpha}_k^{ver}) = \underset{\alpha \in [-1,1)}{\operatorname{argmax}} \, e_{n_v}^H(\alpha) \hat{R}_k^{ver} e_{n_v}(\alpha), \tag{1.11}$$

where $$\hat{R}_k^{ver} = \sum_{i=1}^{n_{rs}} \hat{h}_k^{ver}(i) \hat{h}_k^{ver}(i) \tag{1.12}$$

and $$e_{n_v}(\alpha)=[1 \; e^{j2\pi\alpha} \; \cdots \; e^{j2\pi(n_v-1)\alpha}]^T. \tag{1.13}$$

Next, a $n_h \times n_h$ unitary matrix is constructed with $\hat{\alpha}_k^{hor}$ as $$U_k^{hor,ul} = \left\{ e_{n_h}(\alpha_k^l) \mid \alpha_k^l = \hat{\alpha}_k^{hor} + \frac{l}{n_h}, l \in \mathbb{Z} \cap [0, n_h-1] \right\}, \tag{1.14}$$

which is used to search the other directions of the channel vector in the horizontal direction. Similarly, a $n_v \times n_v$ unitary matrix is constructed with $\hat{\alpha}_k^{ver}$ as $U_k^{ver,ul}$ with the same method as the horizontal dimension.

Let $Q_k^{hor}=U_k^{hor,ul,H} \hat{R}_k^{hor} U_k^{hor,ul}$ and $d^{hor}$ be the vector consisted of the diagonal elements of $Q_k^{hor}$, where each element of $d^{hor}$ corresponds to a different column vector in $U_k^{hor,ul}$, then a $d^{hor} \times 1$ vector $\hat{d}^{hor}$ is constructed by the $d^{hor}$ largest values in $d^{hor}$, and the indices of the $d^{hor}$ elements in $d^{hor}$ are denoted by $i_1$, . . . , $i_{d^{hor}}$. Next, a matrix $\hat{U}_k^{hor,ul}$ is constructed with vectors in $U_k^{hor,ul}$ corresponding to values in $\hat{d}^{hor}$. Obviously, $\hat{U}_k^{hor,ul}$ is consisted of the orthogonal directions with the $d^{hor}$ largest energy of the channel vector in the horizontal direction. The final estimated subspace of the kth user in the horizontal dimension can be constructed as $$V_k^{hor,ul} = \hat{U}_k^{hor,ul} \text{diag}(\hat{d}^{hor}/\|\hat{d}^{hor}\|_2), \quad (1.15)$$

where diag(d) denotes the diagonal matrix with diagonal elements from d and the dimension of $V_k^{hor,ul}$ is $n_h \times d^{hor}$. The subspace of the kth user in the vertical dimension can be constructed as $V_k^{ver,ul}$ similarly as $$V_k^{hor,ul} = \hat{U}_k^{ver,ul} \text{diag}(\hat{d}^{ver}/\|\hat{d}^{ver}\|_2) \quad (1.16)$$

with a dimension of $n_v \times d^{ver}$. Finally, the uplink subspace of the channel vector of the kth user is constructed as $$V_k^{ul} = V_k^{ver,ul} \otimes V_k^{hor,ul}, \quad (1.17)$$

Note that if the antenna indexing order in FIG. 3 or FIG. 4 is changed to be vertical dimension first instead of horizontal dimension, then (1.17) is changed to $V_k^{ul} = V_k^{hor,ul} \otimes V_k^{ver,ul}$.

The subspace $V_k^{dl}$ that representing the downlink channel vector of is constructed as follows.

Let $f_c^{ul}$ and $f_c^{dl}$ denote the central carrier frequencies of the FDD systems in the uplink and downlink respectively. Firstly the principle angle for the horizontal dimension in the downlink is estimated as $$\hat{\alpha}_k^{hor,dl} = \hat{\alpha}_k^{hor} \frac{f_c^{ul}}{f_c^{dl}}. \quad (1.18)$$

Then, the normalized horizontal and vertical subspaces are constructed similarly to (1.14) as $$U_k^{hor,dl} = \left\{ e_{n_h}(\alpha_k^{l,dl}) \mid \alpha_k^{l,dl} = \hat{\alpha}_k^{hor,dl} + \frac{l}{n_h}, l \in \mathbb{Z} \cap [0, n_h - 1] \right\} \quad (1.19)$$

and $$U_k^{ver,dl} = \left\{ e_{n_v}(\alpha_k^{l,dl}) \mid \alpha_k^{l,dl} = \hat{\alpha}_k^{ver,dl} + \frac{l}{n_v}, l \in \mathbb{Z} \cap [0, n_v - 1] \right\}. \quad (1.20)$$

The subspace $\hat{U}_k^{hor,dl}$ and $\hat{U}_k^{ver,dl}$ are constructed by selecting the steering vectors in $U_k^{hor,dl}$ these indices $i_1, \ldots, i_{d^{hor}}$ and the steering vectors in $U_k^{ver,dl}$ with indices $i_1, \ldots, i_{d^{ver}}$ respectively. Finally, the subspace for the kth user in the downlink is constructed as $$V_k^{dl} = (\hat{U}_k^{ver,dl} \text{diag}(\hat{d}^{ver}/\|\hat{d}^{ver}\|)) \otimes (\hat{U}_k^{hor,dl} \text{diag}(\hat{d}^{hor}/\|\hat{d}^{hor}\|)). \quad (1.21)$$

Figure 5:
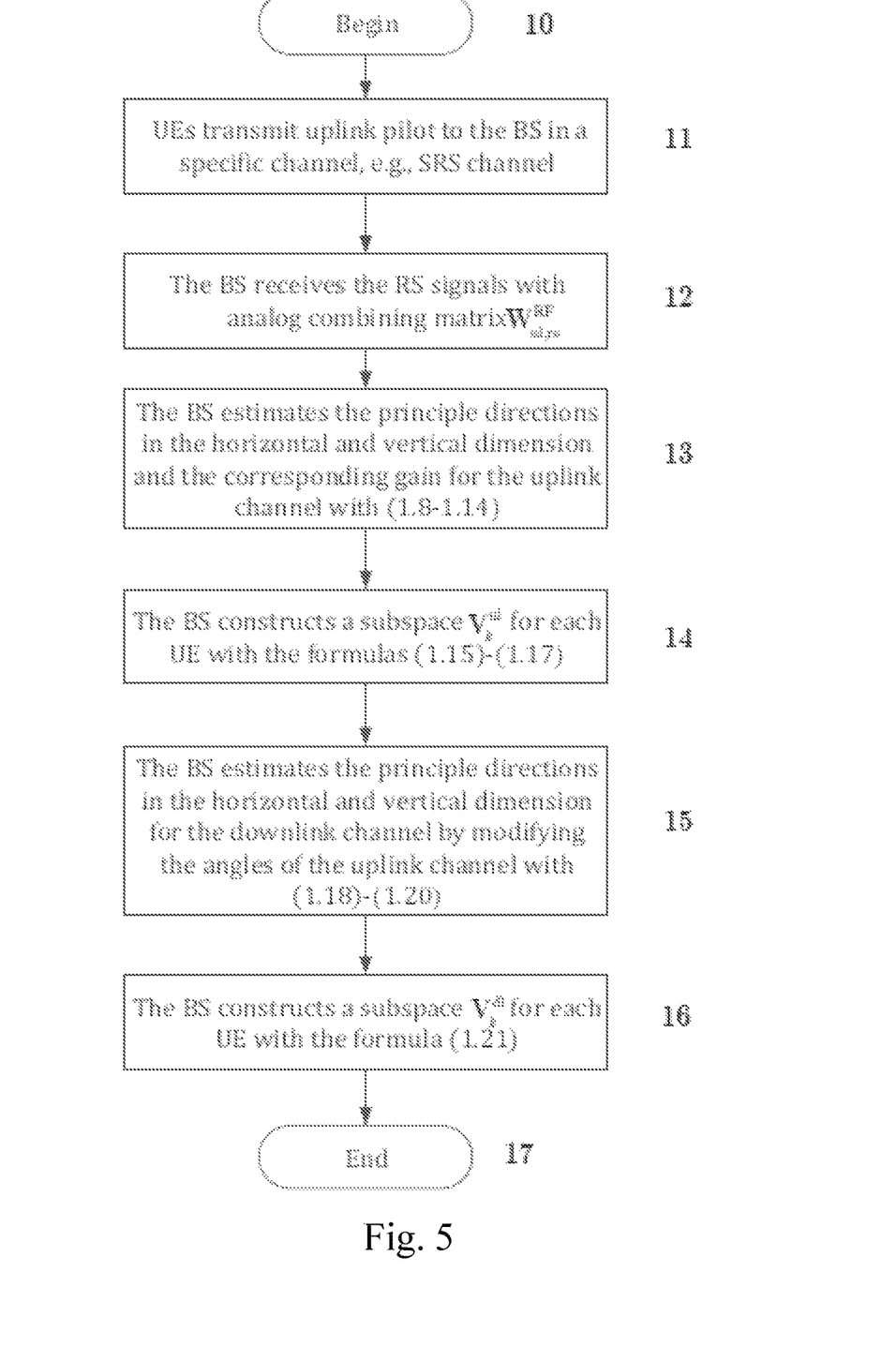
FIG. 5 shows the process of constructing the subspace $V_k^{dl}$ for the downlink channel and the subspace $V_k^{ul}$ for the uplink based on the uplink received pilot signals.

The whole process to obtain subspace $V_k^{dl}$ is summarized in FIG. 5. It begins 10 with UEs transmit uplink pilot to the BS in a specific channel, e.g., SRS channel 11. Then, the BS receives the SRS signals with analog combing matrix $W_{ul,rs}^{RF}$ 12 and estimates the principle directions in the horizontal and vertical dimension and the corresponding gain for the uplink channel with formulas (1.8)-(1.14) 13. Next, the BS constructs a subspace $V_k^{ul}$ for each UE with formulas (1.15)-(1.17) 14. After that, the BS estimates the principle directions in the horizontal and vertical dimension for the downlink channel for each UE by modifying the angels of the uplink channel with (1.18)-(1.20) 15. Finally, the BS constructs a subspace $V_k^{dl}$ for each UE with the formula (1.21) 16 and comes to the end 17.

In the uplink, for the $N_{ue}$ UEs to be scheduled in the next period of time, e.g., one to several OFDM symbols or one to multiple subframes in LTE/LTE-A systems, the BS computes a unique analog combine matrix. Firstly, The BS computes the covariance matrix for the $N_{ue}$ UEs as $$R^{ul} = \gamma \sum_{k=1}^{N_{ue}} V_k^{ul} V_k^{ul}, \quad (1.22)$$

where γ is a scaling factor, e.g., $\gamma = 1/N_{ue}$. Then, it constructs the $N_r \times N_{RF}$ matrix Q with the first $N_{RF}$ eigenvector of $R^{ul}$ corresponding to the $N_{RF}$ largest eigenvalues. The matrix $R^{dl}$ can be updated accordingly when the new pilots or RS are transmitted to estimate the subspace $V_k^{ul}$. For the GAB, one embodiment of the analog combine matrix in the downlink for the embodiments is $$W_{ul}^{RF} = \exp(j\text{Arg}(Q)), \quad (1.23)$$

where Arg(Q) denotes the phase of each element of Q and exp(·) denotes the exponential function of each element of the input matrix. Another embodiment of the analog combine matrix in the uplink is $$W_{ul}^{RF} = Q. \quad (1.24)$$

Figure 6:
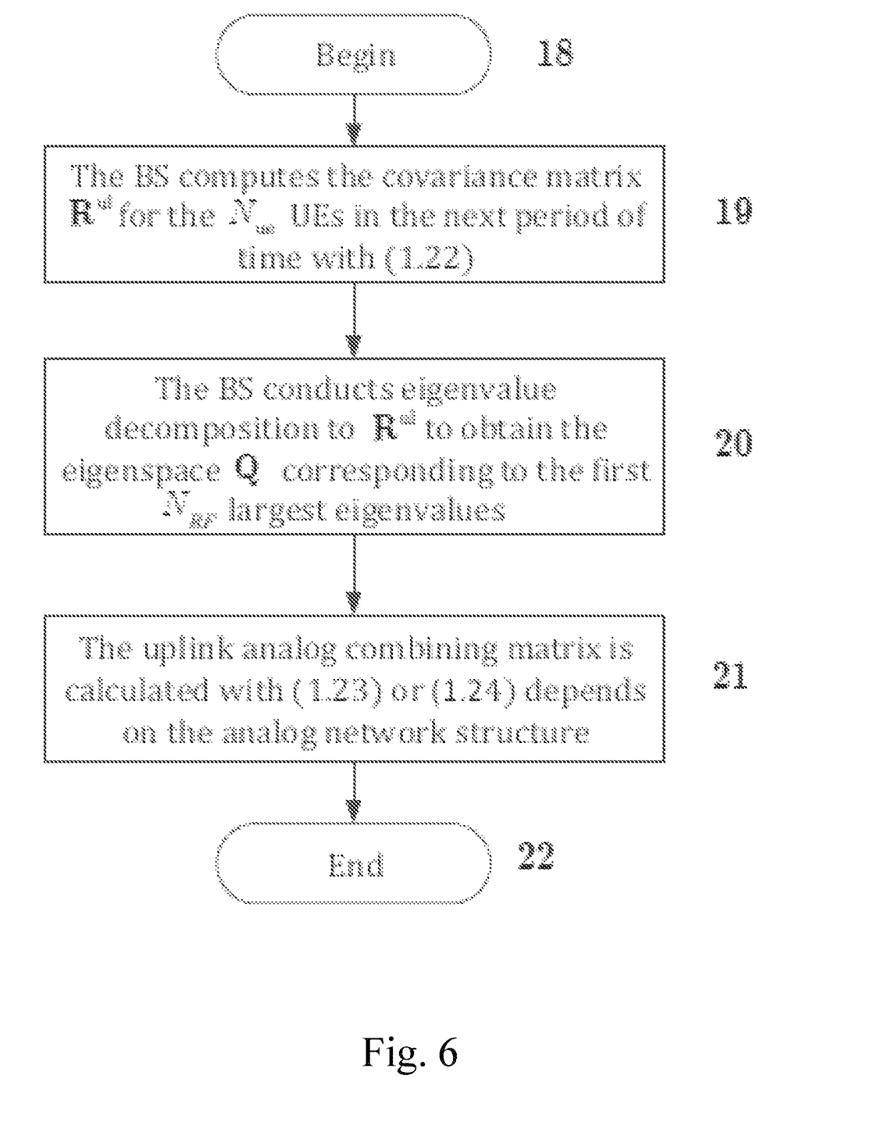
FIG. 6 shows the process of constructing the combining matrix in the uplink $W_{ul}^{RF}$.

The process of computing uplink analog beamforming matrix is summarized in FIG. 6. It begins 18 that the BS computes the covariance matrix $R^{ul}$ for the $N_{ue}$ UEs in the next period of time with (1.22) 19. Then, the BS conducts eigenvalue decomposition to $R^{ul}$ to obtain the eigenspace Q corresponding to the first $N_{RF}$ largest eigenvalues 20. After that, the uplink analog combing matrix is calculated with (1.23) or (1.24) depending on the analog network structure 21 and finally comes to the end 22.

In the downlink, for these $N_{ue}$ UEs to be scheduled in the next period of time, e.g., one to several OFDM symbols or one to multiple subframes in LTE/LTE-A systems, the BS computes a unique analog precoding matrix. Firstly, The BS computes the covariance matrix for the $N_{ue}$ UEs as $$R^{dl} = \gamma \sum_{k=1}^{N_{ue}} V_k^{dl} V_k^{dl}, \quad (1.25)$$

where γ is a scaling factor, e.g., $\gamma = 1/N_{ue}$. Then, it constructs the $N_r \times N_{RF}$ matrix Q with the first $N_{RF}$ eigenvector of $R^{dl}$ corresponding to the $N_{RF}$ largest eigenvalues. The matrix $R^{dl}$ can be updated accordingly when the new pilots or RS are transmitted to estimate the subspace $V_k^{dl}$. For the GAB, one embodiment, of the analog precoding matrix in the downlink for the embodiments is $$W_{dl}^{RF} = \exp(j\text{Arg}(Q)), \quad (1.26)$$

where Arg(Q) denotes the phase of each element of Q and exp(·) denotes the exponential function of each element of the input matrix. Another embodiment of the analog precoding matrix in the downlink is $$W_{dl}^{RF} = Q. \quad (1.27)$$

Figure 7:
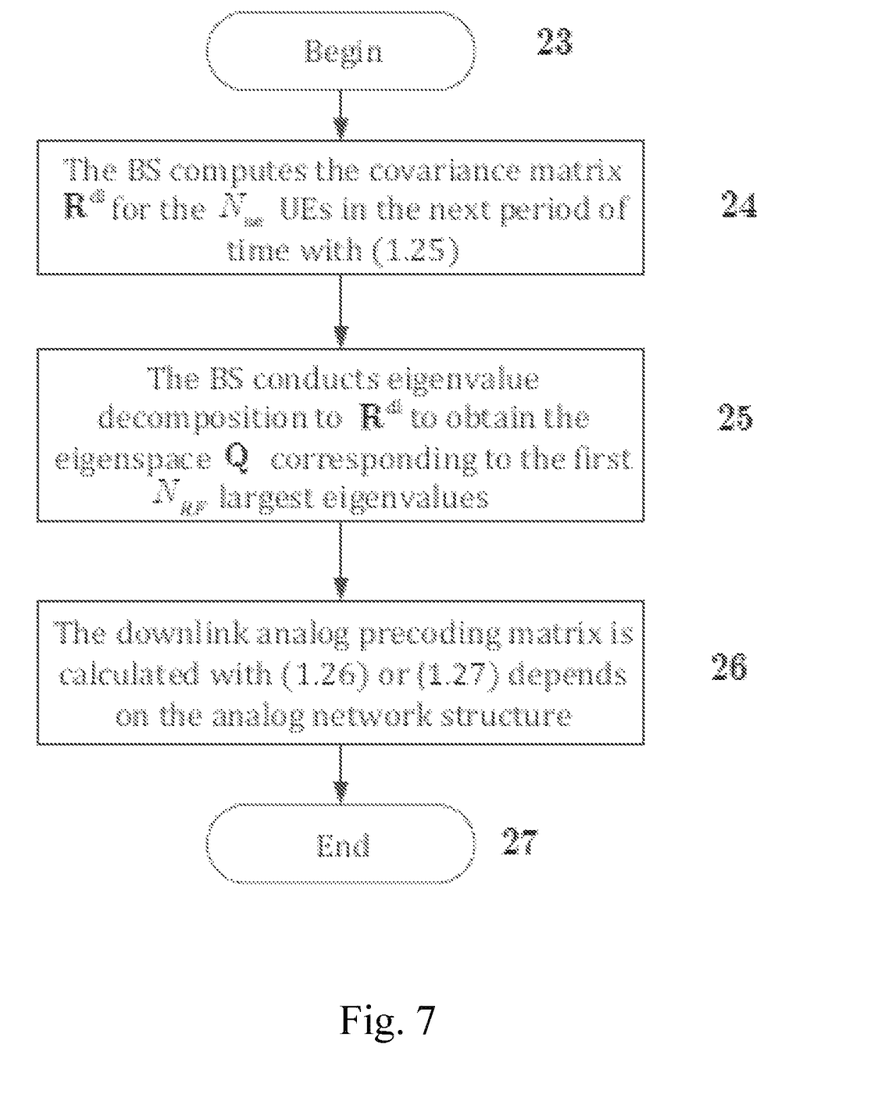
FIG. 7 shows the process of constructing the precoding matrix $W_{dl}^{RF}$ in the downlink.

The process of computing uplink analog beamforming matrix is summarized in FIG. 7. It begins 23 that the BS computes the covariance matrix $R^{dl}$ for the $N_{ue}$ UEs in the next period of time with (1.25) 24. Then, the BS conducts eigenvalue decomposition $R^{dl}$ to obtain the eigenspace Q corresponding to the first $N_{RF}$ largest eigenvalues 25. After that, the uplink analog combing matrix is calculated with (1.26) or (1.27) depending on the analog network structure 26 and finally comes to the end 27.

Method II

In this method, the subspace $V_k^{ul}$ for the uplink channel and subspace $V_k^{dl}$ for the downlink are constructed by the feedback information from each UE, where the BS first transmits channel measurement related pilots in the downlink specific channel, e.g., CSI-RS channel in the LTE/LTE-A, and then each UE estimate the principle angles and the corresponding gains and feeds back to the BS.

In this method, only a small part of the antennas need to transmit downlink pilots. In one embodiment of this method, only $n_h+u_v-1$ antennas need to transmit pilot for the planar array, e.g., any one row and one column of the antennas. This can be realized by selecting $W^{BB}=[I_{n_h+n_v-1}\ 0]^T$, where 0 is a $(N_{RF}-n_h-n_v+1)\times(n_h+n_v-1)$ zero matrix and the analog precoding matrix $W_{dl,rs}^{RF}$ as $$W_{dl,rs}^{RF} = \begin{bmatrix} I_{n_h} & 0 & \ldots & 0 \\ 0 & E_2 & \ldots & E_{n_v} \\ 0 & 0 & \ldots & 0 \end{bmatrix}^T, \quad (1.28)$$

where $E_k$, $k=2, \ldots, n_v$, denotes a $n_v \times n_h$ matrix with all 0 except one 1 on the first element of the kth row. The pilots for the $n_h+n_v-1$ antennas are transmitted in $n_h+n_v-1$ different REs, e.g., for the lth antenna, $l=1,\ldots,n_h+n_v-1$, the pilot signals transmitted at these $N_l$ antennas can be formulated as $x^{RF}=W_{dl,rs}^{RF}W^{BB}s_{rs}^l$, where $s_{rs}^l$ is an all 0 vector except the lth element.

For the kth UE, let the $n_h \times 1$ vector $\hat{h}_k^{hor}(i)$ and $n_v \times 1$ vector $\hat{h}_k^{ver}(i)$, $i=1, \ldots, n_{rs}$, denote the two sets of estimated channel vectors on the pilot subcarriers in the horizontal and vertical dimensions respectively, where $n_{rs}$ is the number of subcarriers for pilot signals. Then, the first principal steering vector to represent the channel of the kth user in the horizontal dimension is estimated as $\hat{e}_k^{hor}(\hat{\alpha}_k^{hor})$ with the same method in (1.8)-(1.10). Similarly, the first principal steering vector to represent the channel of the kth user in the vertical dimension is estimated as $\hat{e}_k^{ver}(\hat{\alpha}_k^{ver})$ with the same method in (1.11)-(1.13). Next, a $n_h \times n_h$ unitary matrix $U_k^{hor}$ is constructed with $\hat{\alpha}_k^{hor}$ as in (1.14), which is used to search the other directions of the channel vector in the horizontal direction. Similarly, a $n_v \times n_v$ unitary matrix is constructed with $\hat{\alpha}_k^{ver}$ as $U_k^{ver}$ with the same method as the horizontal dimension. Let $Q_k^{hor}=U_k^{hor,H}\hat{R}_k^{hor}U_k^{hor}$ and $d^{hor}$ be the vector consisted of the diagonal elements of $Q_k^{hor}$, where each element of $d^{hor}$ corresponds to a different column steering vector in $U_k^{hor}$, then the two $d^{hor} \times 1$ vectors $\hat{d}^{hor}$ and $\hat{\Theta}^{hor}$ are constructed by the $d^{hor}$ largest values in $d^{hor}$ and the corresponding angles contained in the column vectors of $\hat{U}_k^{hor}$. The two $\hat{d}^{ver} \times 1$ vectors $\hat{d}^{ver}$ and $\hat{\Theta}^{ver}$ are constructed similarly to the horizontal case. Then, these elements of $\hat{d}^{hor}$, $\hat{d}^{ver}$, $\hat{\Theta}^{hor}$ and $\hat{\Theta}^{ver}$ are quantized and fed back to the BS through specific uplink channel by the UE. One embodiment of quantize $\hat{d}^{hor}$ is provided here. Let $\hat{d}^{hor}=[g_q^{hor} \ldots g_{d^{hor}}^{hor}]$ and define the normalized vector $$g^{hor}=\hat{d}^{hor}/\|\hat{d}^{hor}\|_2=[\bar{g}_1^{hor} \ldots \bar{g}_{d^{hor}}^{hor}], \quad (1.29)$$

then we have $0 \leq \bar{g}_i^{hor} \leq 1$ and $\sum_{i=1}^{d^{hor}} \bar{g}_i^{hor,2}=1$, which means that only the first $d^{hor}-1$ values of $g^{hor}$ need to be quantized in the interval [0,1] with $k_{pow}^{hor}$ bits and fed back to the BS. Similarly, the first $d^{ver}-1$ values of $g^{ver}$ need to be quantized in the interval [0.1] with $k_{pow}^{ver}$ bits and fed back to the BS. For the angle vector $\hat{\Theta}^{hor}$, once the first element is determined, the other elements only can be one of the $d^{hor}-1$ values that is orthogonal to the first one. Hence, $k_{ang}^{hor}$ bits are used to quantize the first angle while $\lceil\log_2(d^{hor}-1)\rceil$ bits are used for each of the rest $d^{hor}-1$ values. For example, let the ith value be $\bar{\alpha}_{k,i}^{hor}$, then it means that the ith angle is $\alpha_{k,i}^{hor}\bar{\alpha}_{k,1}^{hor}+\text{mod}(\bar{\alpha}_{k,i}^{hor}/n_h,1)$. Similarly, $k_{ang}^{ver}$ bits are used to quantize the first angle while $\lceil\log_2(d^{ver}-1)\rceil$ bits are used for each of the rest $d^{ver}-1$ values.

For the downlink, let $\bar{A}_k^{hor}=[\bar{\alpha}_{k,1}^{hor} \ldots \bar{\alpha}_{k,d^{hor}}^{hor}]$ and $\bar{B}_k^{hor}=[\bar{g}_{k,1}^{hor} \ldots \bar{g}_{k,d^{hor}}^{hor}]$ denote the received feedback angle and gain of the horizontal dimension from the kth UE. With $\bar{A}_k^{hor}=[\bar{\alpha}_{k,1}^{hor} \ldots \bar{\alpha}_{k,d^{hor}}^{hor}]$, the angles of the $d^{hor}$ directions are computed as $$\alpha_{k,i}^{hor} = \begin{cases} \bar{\alpha}_{k,1}^{hor}, & i=1, \\ \bar{\alpha}_{k,1}^{hor}+\text{mod}(\bar{\alpha}_{k,i}^{hor}/n_h,1), & i \neq 1. \end{cases} \quad (1.30)$$

The BS constructs a unitary matrix as $U_k^{hor,dl}=[e_{n_h}^{hor}(\alpha_{k,1}^{hor}) \ldots e_{n_h}^{hor}(\alpha_{k,d^{hor}}^{hor})]$. Then, the subspace for the horizontal dimension is $$V_k^{hor,dl} = U_k^{hor,dl}\text{diag}\left(\left[\bar{B}_k^{hor}, \sqrt{1-\|\bar{B}_k^{hor}\|_2^2}\right]\right). \quad (1.31)$$

Let $\bar{A}_k^{ver}=[\bar{\alpha}_{k,1}^{ver} \ldots \bar{\alpha}_{k,d^{ver}}^{ver}]$ and $\bar{B}_k^{ver}=[\bar{g}_{k,1}^{ver} \ldots \bar{g}_{k,d^{ver}}^{ver}]$ denote received feedback angles and gains of the vertical dimension from the kth UE. $V_k^{ver,dl}$ can be similarly constructed as $V_k^{hor,dl}$. Finally, the subspace of the channel vector of the kth UE is constructed as $$V_k^{dl}=V_k^{ver,dl} \otimes V_k^{hor,dl}. \quad (1.32)$$

Note that if the antenna indexing order is changed to be vertical dimension first then the horizontal dimension, then (1.32) is changed to $V_k^{dl}=V_k^{hor,dl} \otimes V_k^{ver,dl}$.

For the uplink, $f_c^{ul}$ and $f_c^{dl}$ denote the central carrier frequencies of the FDD systems in the uplink and downlink respectively. Firstly, the principle angle for the horizontal dimension in the uplink is modified to $$\bar{\alpha}_{k,1}^{hor,ul}=\bar{\alpha}_{k,1}^{hor}f_c^{dl}/f_c^{ul}. \quad (1.33)$$

With $\bar{A}_k^{hor}=[\bar{\alpha}_{k,1}^{hor} \ldots \bar{\alpha}_{k,d^{hor}}^{hor}]$, these angles of the $d^{hor}$ directions are computed as $$\alpha_{k,i}^{hor,ul} = \begin{cases} \alpha_{k,i}^{hor,ul}, & i=1, \\ \alpha_{k,i}^{hor,ul}+\text{mod}(\bar{\alpha}_{k,i}^{hor}/n_h,1), & i \neq 1. \end{cases} \quad (1.34)$$

The BS constructs a unitary matrix as $U_k^{hor,ul}=[e_{n_h}^{hor}(\alpha_{k,1}^{hor,ul}) \ldots e_{n_h}^{hor}(\alpha_{k,d^{hor}}^{hor,ul})]$. Then, the subspace for the horizontal dimension is $$V_k^{hor,ul} = U_k^{hor,ul}\text{diag}\left(\left[\bar{B}_k^{hor}, \sqrt{1-\|\bar{B}_k^{hor}\|_2^2}\right]\right). \quad (1.35)$$

$V_k^{ver,ul}$ can be similarly constructed as $V_k^{hor,dl}$. Finally, the subspace of the channel vector of the kth UE is constructed as $$V_k^{ul}=V_k^{ver,ul} \otimes V_k^{hor,ul}. \quad (1.36)$$

Figure 8:
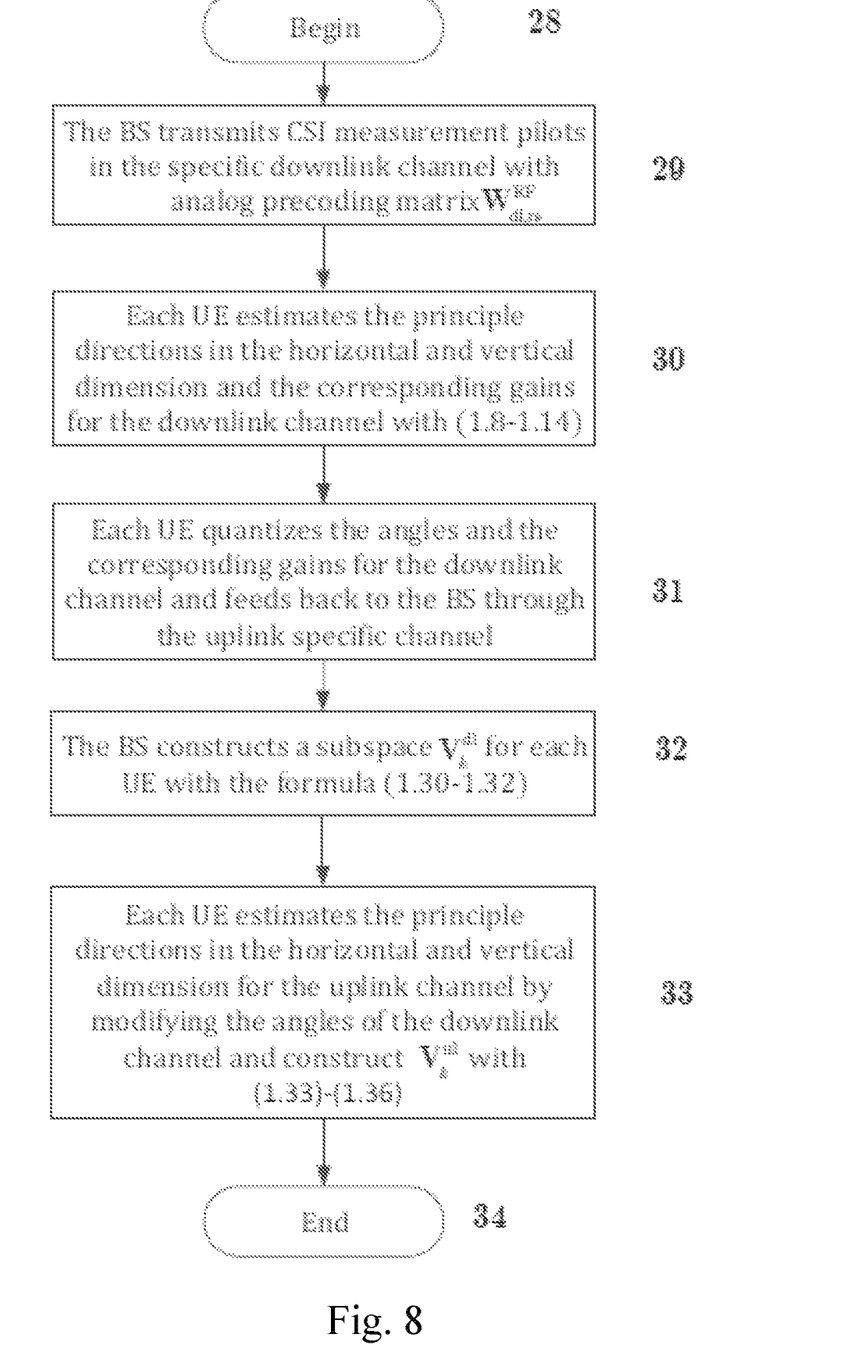
FIG. 8 shows the process of constructing the subspace $V_k^{dl}$ for the downlink channel and the subspace $V_k^{ul}$ for the uplink based on the downlink channel measurement pilots.

The whole process is summarized in FIG. 8. It begins 28 that the BS transmits CSI measurement pilots in the specific downlink channel with analog precoding matrix $W_{dl,rs}^{RF}$ 29.

Then, each UE estimates the principle directions in the horizontal and vertical dimension and the corresponding gains for the downlink channel with (1.8)-(1.14) 30. Next, each UE quantizes the angles and the corresponding gains for the downlink channel and feeds back to the BS through uplink specific channel 31. After that, the BS constructs a subspace $V_k^{dl}$ for each UE with formulas (1.30)-(1.32) 32. Finally, each UE estimates the principle directions in the horizontal and vertical dimension for the uplink channel by modifying angles of the downlink channel and construct $V_k^{dl}$ with (1.33)-(1.36) 33 and comes to the end 34.

In the downlink, for the $N_{ue}$ UEs to be scheduled in the next period of time, e.g., one to several OFDM symbols or one to multiple subframes in LTE/LTE-A systems, the BS computes a unique analog precoding matrix. Firstly, The BS computes the covariance matrix for the $N_{ue}$ UEs as $$R^{dl} = \gamma \sum_{k=1}^{N_{ue}} V_k^{dl} V_k^{dl},$$

where $\gamma$ is a scaling factor, e.g., $\gamma=1/N_{ue}$. Then, it constructs the $N_t \times N_{RF}$ matrix Q with the first $N_{RF}$ eigenvector of $R^{dl}$ corresponding to the $N_{RF}$ largest eigenvalues. The matrix $R^{dl}$ can be updated accordingly when the new pilots or RS are transmitted to estimate the subspace $V_k^{dl}$. For the GAB, one embodiment of the analog precoding matrix in the downlink for the embodiments is $W_{dl}^{RF}=\exp(j\,Arg(Q))$, where Arg(Q) denotes the phase of each element of Q and $\exp(\cdot)$ denotes the exponential function of each element of the input matrix. Another embodiment of the analog precoding matrix in the downlink is $W_{dl}^{RF}=Q$.

In the uplink, for the $N_{ue}$ UEs to be scheduled in the next period of time, e.g., one to several OFDM symbols or one to multiple subframes in LTE/LTE-A systems, the BS computes a unique analog combine matrix. Firstly, The BS computes the covariance matrix for the $N_{ue}$ UEs as $$R^{ul} = \gamma \sum_{k=1}^{N_{ue}} V_k^{ul} V_k^{ul},$$

where $\gamma$ is a sclaing factor, e.g., $\gamma=1/N_{ue}$. Then, it constructs the $N_1 \times N_{RF}$ matrix Q with the first $N_{RF}$ eigenvector of $R^{ul}$ corresponding to the $N_{RF}$ largest eigenvalues. The matrix $R^{dl}$ can be updated accordingly when the new pilots or RS are transmitted to estimate the subspace $V_k^{ul}$. For the GAB, one embodiment of the analog combine matrix in the downlink for the embodiments is $W_{ul}^{RF}=\exp(j\,Arg(Q))$, where Arg(Q) denotes the phase of each element of Q and $\exp(\cdot)$ denotes the exponential function of each element of the input matrix. Another embodiment of the analog combine matrix in the uplink is $W_{ul}^{RF}=Q$.

For the cross-polarized antenna array, the methods I and II can be applied to the sub-array with single polarized antennas to obtain the analog precoding matrix as $W_{dl,sp}^{RF}$, then the final analog precoding matrix is $W_{dl}^{RF}=v_{cp} \otimes W_{dl,sp}^{RF}$ or $W_{dl}^{RF}=W_{dl,sp}^{RF} \otimes v_{cp}$ depending on the indexing method of the antenna array, where $v_{cp}=[1\ e^{j\alpha}]$ is the cross-polarized vector depending on the polarization angles, e.g., $v_{cp}[1\ -1]$ for $\pm\pi/4$ cross polarization. For the uplink, the methods I and II can be applied to the sub-array with single polarized antennas to obtain the analog precoding matrix as $W_{ul,sp}^{RF}$, then the final uplink analog combining matrix is similarly constructed as $W_{ul}^{RF}=v_{cp} \otimes W_{ul,sp}^{RF}$ or $W_{ul}^{RF}=W_{ul,sp}^{RF} \otimes v_{cp}$.

To estimate the subspace $V_k^{dl}$ and $V_k^{ul}$ of each UE, each UE can transmit uplink pilots periodically or based on the BS's requirement message sent in the downlink control channels for the method I. For the periodical transmission, the period can vary from several milliseconds to several second depends on the specific application scenario. Moreover, each UE can be allocated a different period. For example, for the dense urban area or indoor where the UE moves in a low speed, the period can be chosen as several seconds.

To estimate the subspace $Y_k^{dl}$ and $V_k^{ul}$ of each UE, the BS transmits downlink channel measurement pilots periodically for the method II. The period can vary from several milliseconds to several second depends on the specific application scenario. For example, for the dense urban area or indoor where the UE moves in a low speed, the period can be chosen as several seconds.

For the downlink, after $W_{dl}^{RF}$ is determined, one embodiment is that CSI measurement pilots are transmitted with analog precoding matrix $W_{dl}^{RF}$ by the BS. The kth UE estimates the $1 \times N_{RF}$ channel vector seen from the baseband as $h_k^{BB}=h_k W_{dl}^{RF}$, $k=1,\ldots,N_{ue}$. Then, after being quantized, $h_k^{BB}$ is fed back to the BS as $\hat{h}_k^{BB}$. For a specific MU-MIMO group, the indices of the grouped UEs are $i_1,\ldots,i_K$, then the effective baseband channel matrix is $\hat{H}^{BB}=[\hat{h}_{i_1}^{BB,T} \ldots \hat{h}_{i_K}^{BB,T}]^T$. With the linear precoding method, e.g., Zero-Forcing (ZF), the downlink precoding at the baseband can be completed.

For the uplink, after $W_{ul}^{RF}$ is determined, one embodiment is that the BS receives the data signals in the uplink with analog combining matrix $W_{dl}^{RF}$. As a result, the $N_{RF} \times 1$ channel vector of the kth UE is estimated at the baseband as $\hat{h}_k^{BB,ul}=h_k^{ul} W_{ul}^{RF}$. For a specific MU-MIMO group in the uplink, the indices of the grouped UEs are $i_1,\ldots,i_K$, then the effective baseband channel matrix is $\hat{H}^{BB}=[\hat{h}_{i_1}^{BB,ul} \ldots \hat{h}_{i_K}^{BB,ul}]^T$. With the linear detection method, e.g., ZF or Minimum Mean Square Error (MMSE), the uplink signal detection at the baseband can be completed.

REFERENCE

[1] T. L. Marzetta, "Noncooperative Cellular Wireless with Unlimited Numbers of Base Station Antennas," IEEE Trans. Wireless Commun., vol. 9, no. 11, pp. 3590-3600, November 2010.

[2] F. Rusek, D. Persson, B. K. Lau, E. G. Larsson, T. L. Marzetta, O. Edfors, and F. Tufvesson, "Scaling up MIMO: Opportunities and Challenges with Very Large Arrays," IEEE Signal Process. Mag., vol. 30, no. 1, pp. 40-46, January 2013.

[3] E. G. Larsson, F. Tufvesson, O. Edfors, and T. L. Marzetta, "Massive MIMO for Next Generation Wireless Systems," IEEE Commun. Mag., vol. 52, no. 2, pp. 186-195, February 2014.

[4] X. Zhang, A. F. Molisch, and S. Kung, "Variable-phase-shift-based RF-baseband codesign for MIMO antenna selection," IEEE Trans. Sig. Process., vol. 53, no. 11, pp. 4091-4103, November 2005.

[5] V. Venkateswaran and A. J. van der Veen, "Analog beamforming in MIMO communications with phase shift networks and online channel estimation," IEEE Trans. Sig. Process., vol. 58, no. 8, p. 4131-4143, August 2010.

[6] S. Hur, T. Kim, D. Love, J. Krogmeier, T. Thomas, and A. Ghosh, "Millimeter wave beamforming for wireless backhaul and access in small cell networks," IEEE Transactions on Communications., vol. 61, no. 10, p. 4391-4403, 2013.

[7] Y. Tsang, A. Poon, and S. Addepalli, "Coding the beams: Improving beamforming training in mmwave communication system," in in Proc. of 2011 IEEE Global Telecommunications Conference (GLOBECOM), Houston, Tex.

[8] A. Sayeed and J. Brady, "Beamspace MIMO for high-dimensional multiuser communication at millimeter-wave frequencies," in Proc. IEEE Global Telecommun. Conf. (Globecom), pp. 3679-3684, December 2013.

[9] A. Alkhateeb, O. ElAyach, G. Leus, and R. W. H. Jr, "Channel Estimation and Hybrid Precoding for Millimeter Wave Cellular Systems," IEEE Journal of Selected Topics in Signal Processing., vol. 8, no. 5, pp. 831-846, October 2014.

[10] L. Liang, W. Xu, and X. Dong, "Low-Complexity Hybrid Precoding in Massive Multiuser MIMO Systems," IEEE Wireless Communications Letters, vol. 3, no. 6, pp. 653-656, December 2014.

[11] X. Hou, Z. Zhang, and K. H., "DMRS Design and Channel Estimation for LTE-Advanced MIMO Uplink," in VTC 2009 Fall, Anchorage, Ark., 2009.

We claim:

1. A base station (BS) for wireless communication comprising a plural of antennas and radio frequency (RF) transmitting and receiving chains: a plural of base band transmitting paths with a digital to analog converter (DAC) and base band receiving paths with an analog to digital converter (ADC) whereas the number of base band transmitting and receiving paths is less than the number of antennas; and a processor that constructs a subspace for each user equipment (UE) using the principal angle information contained in partial channel state information (CSI) obtained on channels associated with a part of the BS antennas, derives an analog beamforming matrix and/or an analog combining matrix from the subspaces of all the UEs selected for communication with the BS to achieve analog beamforming, and additionally performs a beamforming at the base band, wherein the BS transmits CSI measurement pilots in downlink for each UE to estimate the partial CSI and receives the partial CSI fed back by a UE, and the processor applies a predefined analog beamforming matrix to map the pilot signals to a part of antennas for transmitting CSI measurement pilot in the downlink, wherein the predefined analog beamforming matrix is determined by the number of RF chains, the arrangement of the antenna array and the number of antennas at the BS.

2. A base station (BS) for wireless communication comprising a plural of antennas and radio frequency (RF) transmitting and receiving chains; a plural of base band transmitting paths with a digital to analog converter (DAC) and base band receiving paths with an analog to digital converter (ADC) whereas the number of base band transmitting and receiving paths is less than the number of antennas; and a processor that constructs a subspace for each user equipment (UE) using the principal angle information contained in partial channel state information (CSI) obtained on channels associated with a part of the BS antennas, derives an analog beamforming matrix and/or an analog combining matrix from the subspaces of all the UEs selected for communication with the BS to achieve analog beamforming, and additionally performs a beamforming at the base band, wherein the BS transmits CSI measurement pilots in downlink for each UE to estimate the partial CSI and receives the partial CSI fed back by a UE, and the processor modifies the angles fed back from the UE according to the ratio of carrier frequency in the uplink and downlink and constructs a subspace to represent the uplink CSI of a UE based on the modified angles and associated gains.

3. A base station (BS) for wireless communication comprising a plural of antennas and radio frequency (RF) transmitting and receiving chains: a plural of base band transmitting paths with a digital to analog converter (DAC) and base band receiving paths with an analog to digital converter (ADC) whereas the number of base band transmitting and receiving paths is less than the number of antennas; and a processor that constructs a subspace for each user equipment (UE) using the principal angle information contained in partial channel state information (CSI) obtained on channels associated with a part of the BS antennas, derives an analog beamforming matrix and/or an analog combining matrix from the subspaces of all the UEs selected for communication with the BS to achieve analog beamforming, and additionally performs a beamforming at the base band, wherein the processor estimates the partial CSI using uplink pilots sent from a UE and applies a predefined analog combining matrix to map the received pilot signals at all antenna to RF chains, wherein the predefined analog combining matrix is determined by the number of RF chains, the arrangement of the antenna array and the number of antennas at the BS.

\* \* \* \* \*